US009552045B2

(12) United States Patent
Ragavan

(10) Patent No.: US 9,552,045 B2
(45) Date of Patent: Jan. 24, 2017

(54) METHOD, APPARATUS, AND SYSTEM FOR CONTROLLING POWER CONSUMPTION OF UNUSED HARDWARE OF A LINK INTERFACE

(71) Applicant: Intel Corporation, Santa Clara, CA (US)

(72) Inventor: Vickneswaran Ragavan, Bayan Lapas (MY)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 14/426,597

(22) PCT Filed: Mar. 20, 2014

(86) PCT No.: PCT/US2014/031304
§ 371 (c)(1),
(2) Date: Mar. 6, 2015

(87) PCT Pub. No.: WO2015/142336
PCT Pub. Date: Sep. 24, 2015

(65) Prior Publication Data
US 2016/0259394 A1 Sep. 8, 2016

(51) Int. Cl.
G06F 1/32 (2006.01)
G06F 1/26 (2006.01)
(Continued)

(52) U.S. Cl.
CPC ........... *G06F 1/3234* (2013.01); *G06F 1/3253* (2013.01); *G06F 1/3287* (2013.01); *G06F 13/00* (2013.01);
(Continued)

(58) Field of Classification Search
CPC ..................................................... G06F 1/3203
(Continued)

(56) References Cited

U.S. PATENT DOCUMENTS 5,396,635 A 3/1995 Fung
5,781,784 A 7/1998 McKinley
(Continued)

FOREIGN PATENT DOCUMENTS

CN 101546300 9/2009
EP 1599006 A1 11/2005
(Continued)

OTHER PUBLICATIONS

International Searching Authority, "Notification of Transmittal of the International Search Report" mailed Dec. 19, 2014 in International application No. PCT/US2014/031304.
(Continued)

*Primary Examiner* — Suresh Suryawanshi
(74) *Attorney, Agent, or Firm* — Trop, Pruner & Hu, P.C.

(57) ABSTRACT

In an embodiment, a plurality of hardware buffers each may store information associated with one or more virtual channels. In turn, a configuration logic is to determine an identifier corresponding to a maximum number of virtual channels commonly supported by first and second devices coupled via a link and to obtain a control value based on the identifier. A gate logic coupled to the configuration logic is to provide an operating voltage to corresponding ones of the hardware buffers based on the control value. In this way, the operating voltage can be withheld from at least one of the hardware buffers when the maximum number of virtual channels is less than the plurality of hardware buffers. Other embodiments are described and claimed.

27 Claims, 10 Drawing Sheets

(51) Int. Cl.
  *G06F 3/00* (2006.01)
  *G06F 13/00* (2006.01)
  *G06F 15/16* (2006.01)
  *H04L 12/931* (2013.01)

(52) U.S. Cl.
  CPC .............. *G06F 15/16* (2013.01); *H04L 49/00* (2013.01); *Y02B 60/1235* (2013.01); *Y02B 60/1282* (2013.01)

(58) Field of Classification Search
  USPC ........................................................ 713/320
  See application file for complete search history.

(56) References Cited

U.S. PATENT DOCUMENTS

| | | | |
|---|---|---|---|
| 6,009,488 A | 12/1999 | Kavipurapu | |
| 6,222,825 B1 | 4/2001 | Mangin et al. | |
| 6,484,223 B1 | 11/2002 | Lenz | |
| 6,526,469 B1 | 2/2003 | Drehmel et al. | |
| 6,597,689 B1* | 7/2003 | Chiu | H04L 12/5601 370/354 |
| 6,665,742 B2 | 12/2003 | Owen et al. | |
| 6,715,055 B1* | 3/2004 | Hughes | H04L 12/5693 709/238 |
| 6,938,094 B1 | 8/2005 | Keller et al. | |
| 7,136,953 B1 | 11/2006 | Bisson et al. | |
| 7,188,263 B1 | 3/2007 | Rubinstein et al. | |
| 7,313,712 B2 | 12/2007 | Cherukuri et al. | |
| 7,418,005 B2 | 8/2008 | Arima | |
| 7,472,299 B2* | 12/2008 | Mukherjee | G06F 13/36 713/300 |
| 7,660,261 B2 | 2/2010 | Keromytis et al. | |
| 8,046,488 B2 | 10/2011 | Cherukuri | |
| 8,103,788 B1* | 1/2012 | Miranda | G06F 13/385 709/224 |
| 8,379,659 B2* | 2/2013 | Vangal | H04L 47/30 370/429 |
| 8,954,635 B2* | 2/2015 | Hughes | G06F 13/36 710/310 |
| 9,385,962 B2* | 7/2016 | Rimmer | H04L 47/39 |
| 2002/0087716 A1 | 7/2002 | Mustafa | |
| 2002/0103945 A1 | 8/2002 | Owen | |
| 2003/0088799 A1 | 5/2003 | Bodas | |
| 2003/0093539 A1 | 5/2003 | Simeloff et al. | |
| 2003/0093593 A1* | 5/2003 | Ennis | G06F 13/387 710/36 |
| 2003/0185308 A1 | 10/2003 | Schoenborn | |
| 2003/0221026 A1 | 11/2003 | Newman | |
| 2004/0128576 A1 | 7/2004 | Gutman et al. | |
| 2004/0153952 A1 | 8/2004 | Sharma et al. | |
| 2004/0264466 A1 | 12/2004 | Huang | |
| 2005/0188232 A1 | 8/2005 | Weng et al. | |
| 2005/0259599 A1 | 11/2005 | Cherukuri et al. | |
| 2005/0259696 A1 | 11/2005 | Steinman | |
| 2005/0262284 A1 | 11/2005 | Cherukuri et al. | |
| 2006/0015761 A1 | 1/2006 | Kwa et al. | |
| 2009/0248999 A1 | 10/2009 | Kusachi | |

FOREIGN PATENT DOCUMENTS

| | | |
|---|---|---|
| EP | 2105840 | 9/2009 |
| JP | 04-359335 | 11/1992 |
| JP | 2002-259327 | 9/2002 |
| JP | 2003-037613 | 7/2003 |
| TW | 521189 | 2/2003 |
| TW | 201210275 | 3/2012 |

OTHER PUBLICATIONS

Taiwan Intellectual Property Office, Office Action mailed Apr. 28, 2016 in Taiwanese Patent Application No. 104103912.
PCI Express Base Specification, Revision 1.0, Jul. 22, 2002, pp. 1-8 and 165-189.

* cited by examiner

| Bit | VC7 10 | VC6 9 | VC5 8 | VC4 7 | VC3 6 | VC2 5 | VC1 4 | VC0 3 | Link Max Value | | |
|---|---|---|---|---|---|---|---|---|---|---|---|
| | | | | | | | | | 2 | 1 | 0 |
| | 0 | 0 | 0 | 0 | 0 | 0 | 0 | 1 | 0 | 0 | 0 |
| | 0 | 0 | 0 | 0 | 0 | 0 | 1 | 1 | 0 | 0 | 1 |
| | 0 | 0 | 0 | 0 | 0 | 1 | 1 | 1 | 0 | 1 | 0 |
| | 0 | 0 | 0 | 0 | 1 | 1 | 1 | 1 | 0 | 1 | 1 |
| | 0 | 0 | 0 | 1 | 1 | 1 | 1 | 1 | 1 | 0 | 0 |
| | 0 | 0 | 1 | 1 | 1 | 1 | 1 | 1 | 1 | 0 | 1 |
| | 0 | 1 | 1 | 1 | 1 | 1 | 1 | 1 | 1 | 1 | 0 |
| | 1 | 1 | 1 | 1 | 1 | 1 | 1 | 1 | 1 | 1 | 1 |

METHOD, APPARATUS, AND SYSTEM FOR CONTROLLING POWER CONSUMPTION OF UNUSED HARDWARE OF A LINK INTERFACE

TECHNICAL FIELD

This disclosure pertains to computing systems, and in particular (but not exclusively) to power management of link interfaces in such systems.

DETAILED DESCRIPTION

Figure 1:
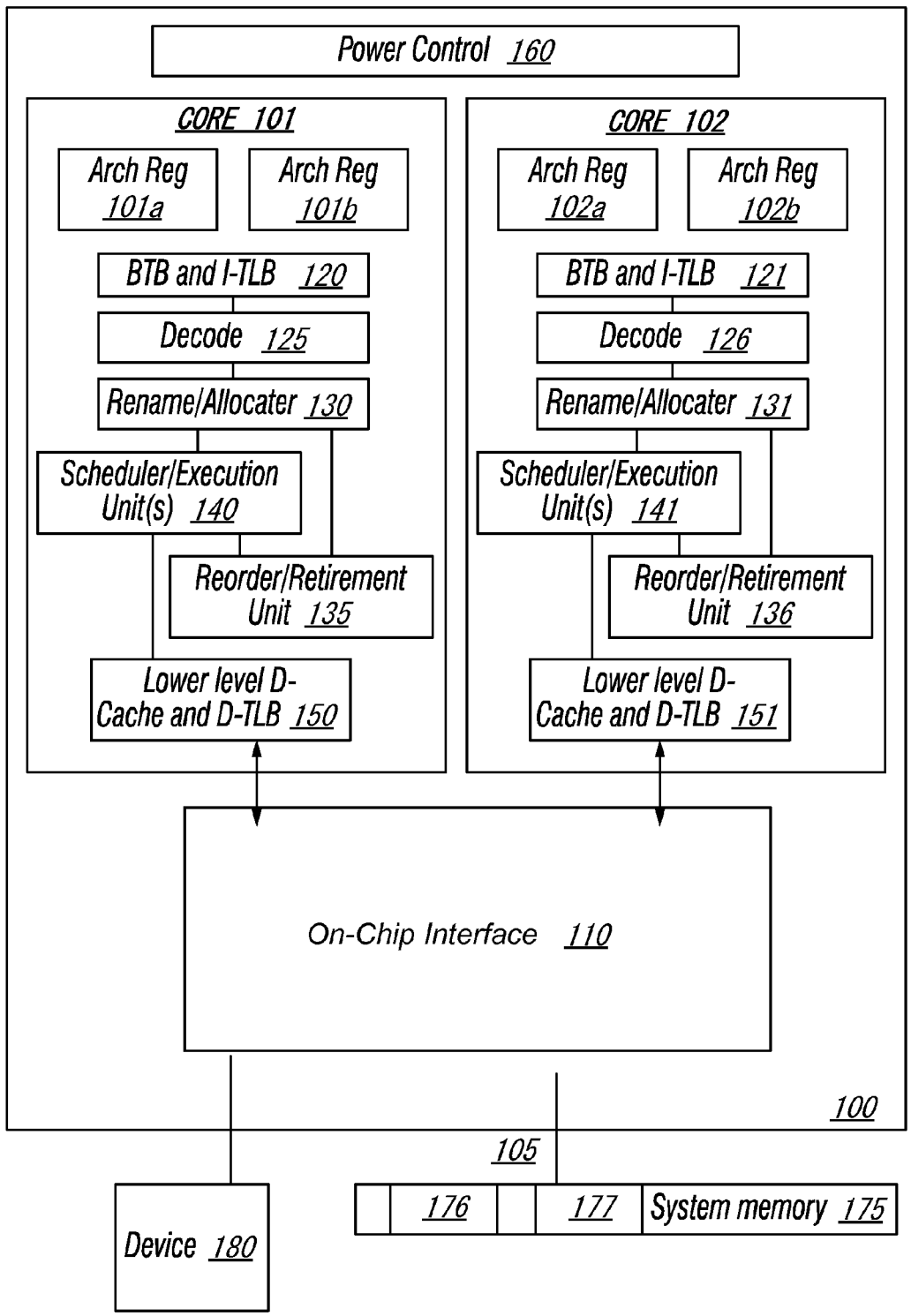
FIG. 1 is an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independent state dently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such as binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as reorder buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

One interconnect fabric architecture includes the PCIe architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 2:
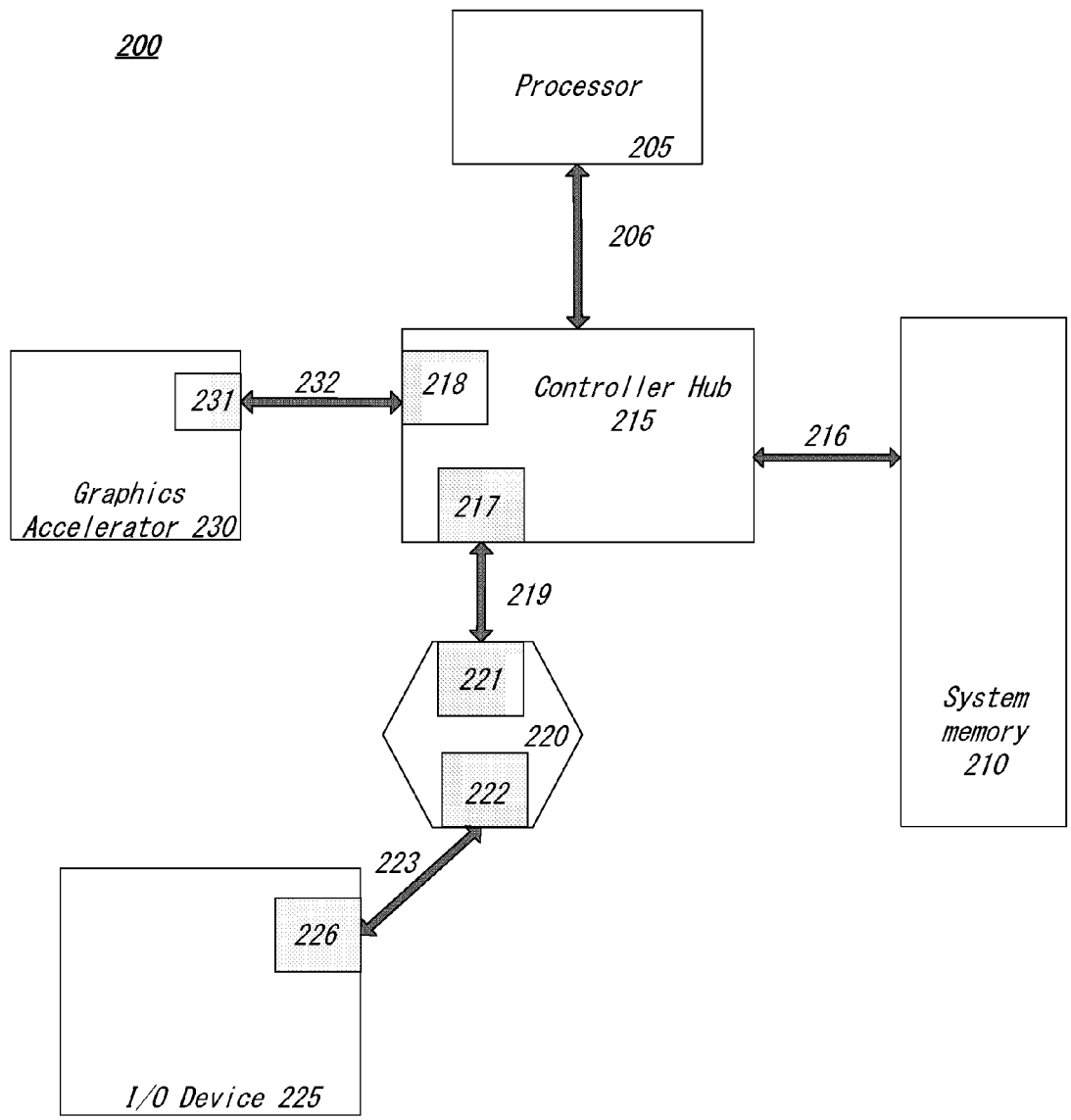
FIG. 2 is an embodiment of a fabric composed of point-to-point links that interconnect a set of components.

Referring to FIG. 2, an embodiment of a fabric composed of point-to-point Links that interconnect a set of components is illustrated. System 200 includes processor 205 and system memory 210 coupled to controller hub 215. Processor 205 includes any processing element, such as a microprocessor, a host processor, an embedded processor, a co-processor, or other processor. Processor 205 is coupled to controller hub 215 through front-side bus (FSB) 206. In one embodiment, FSB 206 is a serial point-to-point interconnect as described below. In another embodiment, link 206 includes a serial, differential interconnect architecture that is compliant with different interconnect standard.

System memory 210 includes any memory device, such as random access memory (RAM), non-volatile (NV) memory, or other memory accessible by devices in system 200. System memory 210 is coupled to controller hub 215 through memory interface 216. Examples of a memory interface include a double-data rate (DDR) memory interface, a dual-channel DDR memory interface, and a dynamic RAM (DRAM) memory interface.

In one embodiment, controller hub 215 is a root hub, root complex, or root controller in a Peripheral Component Interconnect Express (PCIe or PCIE) interconnection hierarchy. Examples of controller hub 215 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 205, while controller 215 is to communicate with I/O devices, in a similar manner as described below. In some embodiments, peer-to-peer routing is optionally supported through root complex 215.

Here, controller hub 215 is coupled to switch/bridge 220 through serial link 219. Input/output modules 217 and 221, which may also be referred to as interfaces/ports 217 and 221, include/implement a layered protocol stack to provide communication between controller hub 215 and switch 220. In one embodiment, multiple devices are capable of being coupled to switch 220.

Switch/bridge 220 routes packets/messages from device 225 upstream, i.e. up a hierarchy towards a root complex, to controller hub 215 and downstream, i.e. down a hierarchy away from a root controller, from processor 205 or system memory 210 to device 225. Switch 220, in one embodiment, is referred to as a logical assembly of multiple virtual PCI-to-PCI bridge devices. Device 225 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 225 may include a PCIe to PCI/PCI-X bridge to support legacy or other version PCI devices. Endpoint devices in PCIe are often classified as legacy, PCIe, or root complex integrated endpoints.

Graphics accelerator 230 is also coupled to controller hub 215 through serial link 232. In one embodiment, graphics accelerator 230 is coupled to an MCH, which is coupled to an ICH. Switch 220, and accordingly I/O device 225, is then coupled to the ICH. I/O modules 231 and 218 are also to implement a layered protocol stack to communicate between graphics accelerator 230 and controller hub 215. Similar to the MCH discussion above, a graphics controller or the graphics accelerator 230 itself may be integrated in processor 205.

Figure 3:
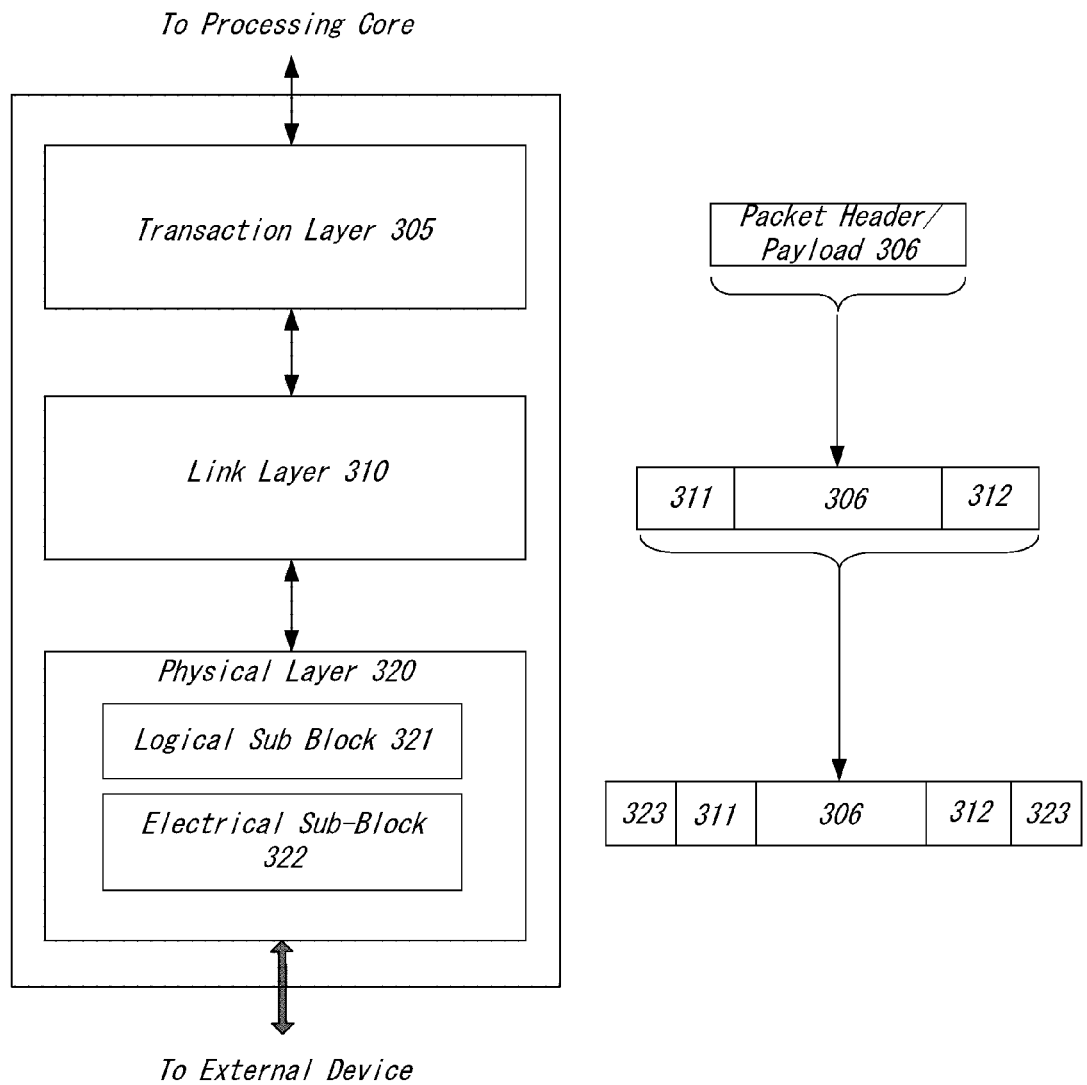
FIG. 3 is an embodiment of a layered protocol stack.

Turning to FIG. 3 an embodiment of a layered protocol stack is illustrated. Layered protocol stack 300 includes any form of a layered communication stack, such as a Quick Path Interconnect (QPI) stack, a PCIe stack, a next generation high performance computing interconnect stack, or other layered stack. Although the discussion immediately below in reference to FIGS. 2-5 are in relation to a PCIe stack, the same concepts may be applied to other interconnect stacks. In one embodiment, protocol stack 300 is a PCIe protocol stack including transaction layer 305, link layer 310, and physical layer 320. An interface may be represented as communication protocol stack 300. Representation as a communication protocol stack may also be referred to as a module or interface implementing/including a protocol stack.

PCI Express uses packets to communicate information between components. Packets are formed in the Transaction Layer 305 and Data Link Layer 310 to carry the information from the transmitting component to the receiving component. As the transmitted packets flow through the other layers, they are extended with additional information necessary to handle packets at those layers. At the receiving side the reverse process occurs and packets get transformed from their Physical Layer 320 representation to the Data Link Layer 310 representation and finally (for Transaction Layer Packets) to the form that can be processed by the Transaction Layer 305 of the receiving device.

In one embodiment, transaction layer 305 is to provide an interface between a device's processing core and the interconnect architecture, such as data link layer 310 and physical layer 320. In this regard, a primary responsibility of the transaction layer 305 is the assembly and disassembly of packets (i.e., transaction layer packets, or TLPs). The translation layer 305 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 305. An external device at the opposite end of the link, such as controller hub, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 805 assembles packet header/payload 806. Format for current packet headers/payloads may be found in the PCIe specification at the PCIe specification website.

Figure 4:
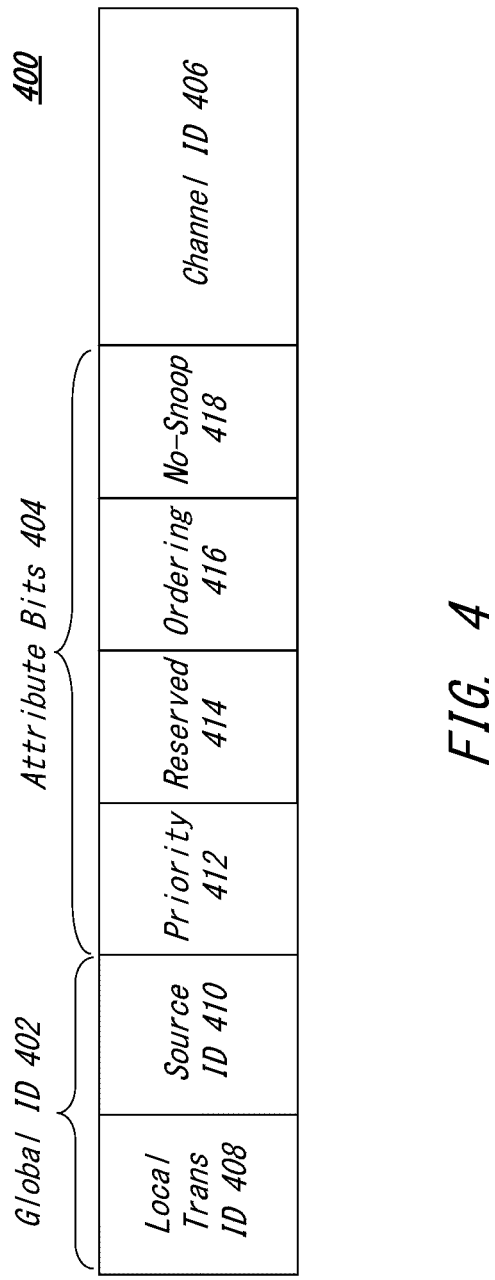
FIG. 4 is an embodiment of a PCIe transaction descriptor.

Quickly referring to FIG. 4, an embodiment of a PCIe transaction descriptor is illustrated. In one embodiment, transaction descriptor 400 is a mechanism for carrying transaction information. In this regard, transaction descriptor 400 supports identification of transactions in a system. Other potential uses include tracking modifications of default transaction ordering and association of transaction with channels.

Transaction descriptor 400 includes global identifier field 402, attributes field 404 and channel identifier field 406. In the illustrated example, global identifier field 402 is depicted comprising local transaction identifier field 408 and source identifier field 410. In one embodiment, global transaction identifier 402 is unique for all outstanding requests.

According to one implementation, local transaction identifier field 408 is a field generated by a requesting agent, and it is unique for all outstanding requests that require a completion for that requesting agent. Furthermore, in this example, source identifier 410 uniquely identifies the requestor agent within a PCIe hierarchy. Accordingly, together with source ID 410, local transaction identifier 408 field provides global identification of a transaction within a hierarchy domain.

Attributes field 404 specifies characteristics and relationships of the transaction. In this regard, attributes field 404 is potentially used to provide additional information that allows modification of the default handling of transactions. In one embodiment, attributes field 404 includes priority field 412, reserved field 414, ordering field 416, and no-snoop field 418. Here, priority sub-field 412 may be modified by an initiator to assign a priority to the transaction. Reserved attribute field 414 is left reserved for future, or vendor-defined usage. Possible usage models using priority or security attributes may be implemented using the reserved attribute field.

In this example, ordering attribute field 416 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 418 is utilized to determine if transactions are snooped. As shown, channel ID Field 406 identifies a channel that a transaction is associated with.

Link layer 310, also referred to as data link layer 310, acts as an intermediate stage between transaction layer 305 and the physical layer 320. In one embodiment, a responsibility of the data link layer 310 is providing a reliable mechanism for exchanging Transaction Layer Packets (TLPs) between two components a link. One side of the Data Link Layer 310 accepts TLPs assembled by the Transaction Layer 305, applies packet sequence identifier 311, i.e. an identification number or packet number, calculates and applies an error detection code, i.e. CRC 312, and submits the modified TLPs to the Physical Layer 320 for transmission across a physical to an external device.

In one embodiment, physical layer 320 includes logical sub block 321 and electrical sub-block 322 to physically transmit a packet to an external device. Here, logical sub-block 321 is responsible for the "digital" functions of Physical Layer 321. In this regard, the logical sub-block includes a transmit section to prepare outgoing information for transmission by physical sub-block 322, and a receiver section to identify and prepare received information before passing it to the Link Layer 310.

Physical block 322 includes a transmitter and a receiver. The transmitter is supplied by logical sub-block 321 with symbols, which the transmitter serializes and transmits onto to an external device. The receiver is supplied with serialized symbols from an external device and transforms the received signals into a bit-stream. The bit-stream is de-serialized and supplied to logical sub-block 321. In one embodiment, an 8b/10b transmission code is employed, where ten-bit symbols are transmitted/received. Here, special symbols are used to frame a packet with frames 323. In addition, in one example, the receiver also provides a symbol clock recovered from the incoming serial stream.

As stated above, although transaction layer 305, link layer 310, and physical layer 320 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a QPI layered protocol is utilized.

Figure 5:
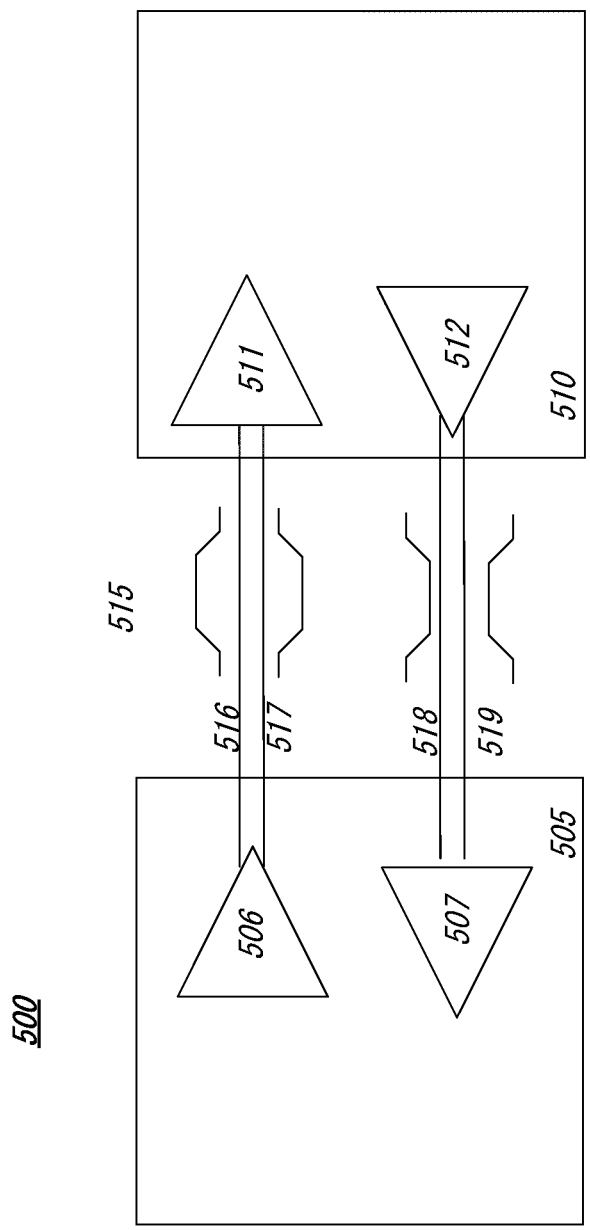
FIG. 5 is an embodiment of a PCIe serial point to point fabric.

Referring next to FIG. 5, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 506/511 and a receive pair 512/507. Accordingly, device 505 includes transmission logic 506 to transmit data to device 510 and receiving logic 507 to receive data from device 510. In other words, two transmitting paths, i.e. paths 516 and 517, and two receiving paths, i.e. paths 518 and 515, are included in a PCIe link.

A transmission path refers to any path for transmitting data, such as a transmission line, a copper line, an optical line, a wireless communication channel, an infrared communication link, or other communication path. A connection between two devices, such as device 505 and device 510, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 516 and 517, to transmit differential signals. As an example, when line 516 toggles from a low voltage level to a high voltage level, i.e., a rising edge, line 517 drives from a high logic level to a low logic level, i.e. a falling edge. Differential signals potentially demonstrate better electrical characteristics, such as better signal integrity, i.e., cross-coupling, voltage overshoot/undershoot, ringing, etc. This allows for better timing window, which enables faster transmission frequencies.

Figure 6:
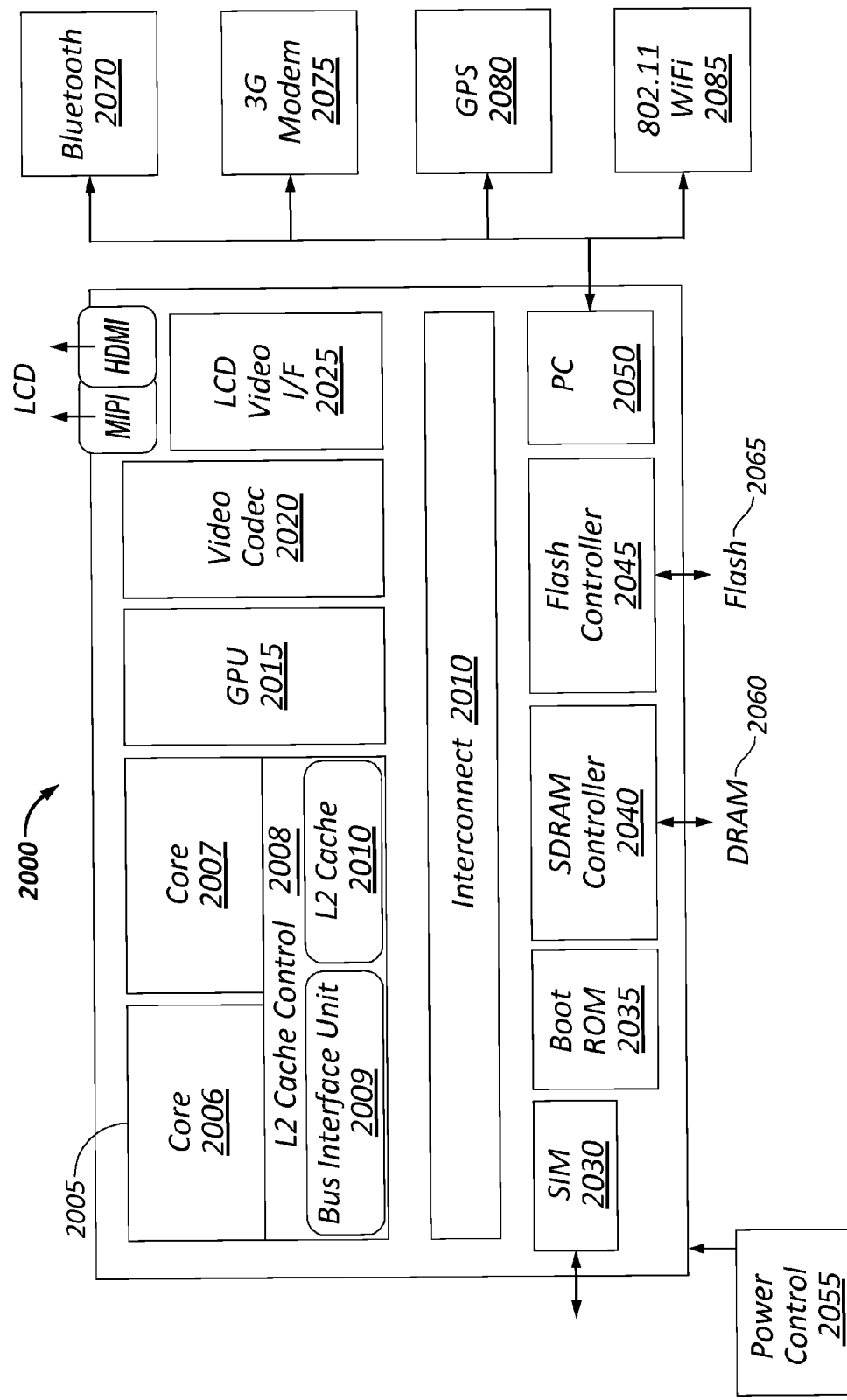
FIG. 6 is a block diagram of a SoC design in accordance with an embodiment.

Turning next to FIG. 6, an embodiment of a SoC design in accordance with an embodiment is depicted. As a specific illustrative example, SoC 2000 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SoC 2000 includes 2 cores—2006 and 2007. Similar to the discussion above, cores 2006 and 2007 may conform to an Instruction Set Architecture, such as an Intel®

Architecture Core™-based processor, an Advanced Micro Devices, Inc. (AMD) processor, a MIPS-based processor, an ARM-based processor design, or a customer thereof, as well as their licensees or adopters. Cores 2006 and 2007 are coupled to cache control 2008 that is associated with bus interface unit 2009 and L2 cache 2010 to communicate with other parts of system 2000. Interconnect 2010 includes an on-chip interconnect, such as an IOSF, AMBA, or other interconnect discussed above, which potentially implements one or more aspects of the described herein.

Interconnect 2010 provides communication channels to the other components, such as a Subscriber Identity Module (SIM) 2030 to interface with a SIM card, a boot ROM 2035 to hold boot code for execution by cores 2006 and 2007 to initialize and boot SOC 2000, a SDRAM controller 2040 to interface with external memory (e.g. DRAM 2060), a flash controller 2045 to interface with non-volatile memory (e.g. Flash 2065), a peripheral controller 2050 (e.g. Serial Peripheral Interface) to interface with peripherals, video codecs 2020 and Video interface 2025 to display and receive input (e.g. touch enabled input), GPU 2015 to perform graphics related computations, etc. Any of these interfaces may incorporate aspects described herein.

In addition, the system illustrates peripherals for communication, such as a Bluetooth module 2070, 3G modem 2075, GPS 2080, and WiFi 2085. Also included in the system is a power controller 2055. Note as stated above, a UE includes a radio for communication. As a result, these peripheral communication modules are not all required. However, in a UE some form a radio for external communication is to be included.

In various embodiments, at least portions of circuitry of one or more devices coupled by way of a given interconnect may be power controlled (e.g., power gated) when it is determined by configuration of the device that such circuitry will be unused. As an example of the embodiments described herein, circuitry associated with one or more virtual channels that provide communication via the interconnect can be placed in a power down state (e.g., by not providing an operating voltage to such circuitry) when it is determined by configuration of a system that such virtual channels will not be used for communication. Of course, embodiments are not limited to this example, and the techniques described herein apply equally to power control of other circuitry.

Figure 7:
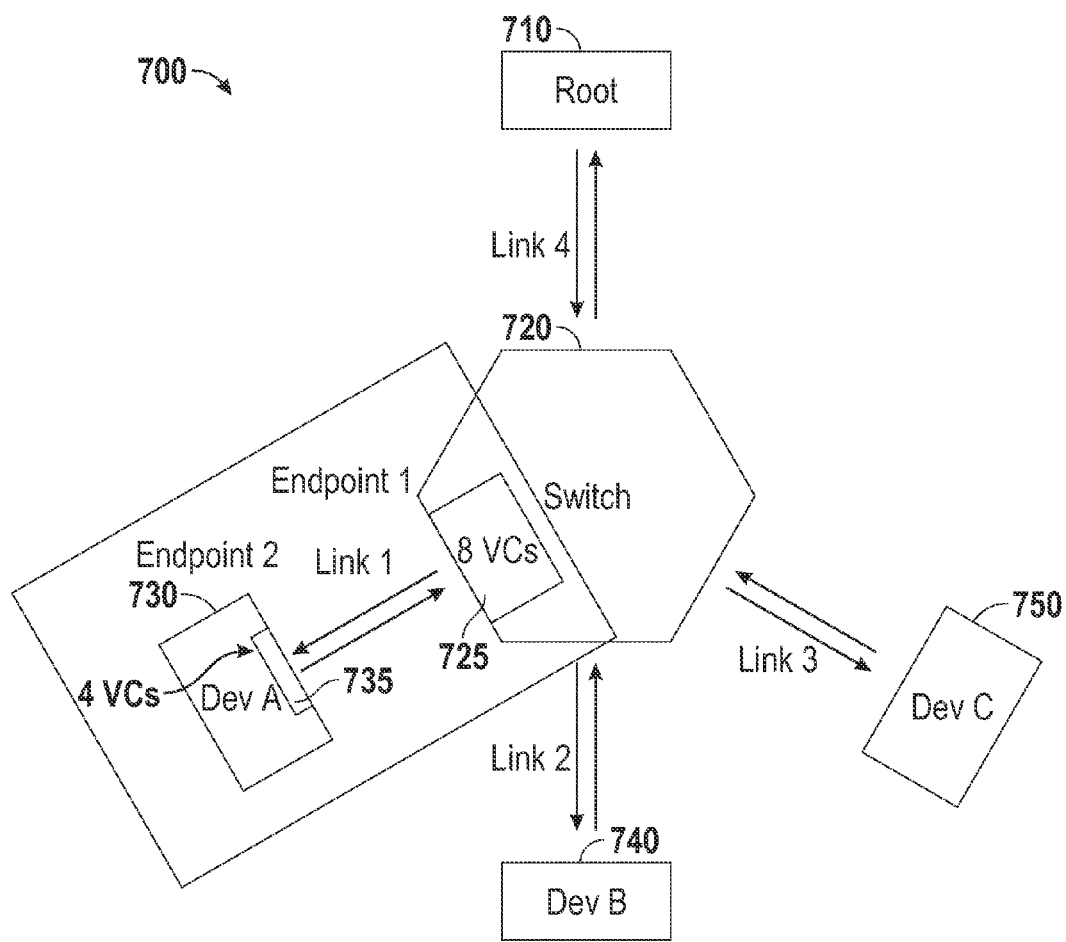
FIG. 7 is a block diagram of a system in accordance with an embodiment of the present invention.

FIG. 7 is a block diagram of a system in accordance with an embodiment of the present invention. As shown in FIG. 7, system 700 is an implementation of a PCIe™ system having various devices coupled to a switch 720. Each of the devices couples to switch 720 by a corresponding link (respectively Links 1-4). Note that each of the links may have different characteristics and operating parameters, in an embodiment.

As examples, devices 730, 740 and 750 may be different types of peripheral devices. As one such example, device 730 may be a graphics accelerator device, device 740 may be a storage device, and device 750 may be another type of portable device, e.g., a capture device. Switch 720 further couples to a root complex 710 by another link (Link 4). As one example, root complex 710 may be a main data processor of the system, such as a multi-core processor. Of course other examples of complexes are possible.

Referring particularly to the connection between switch 720 and device 730, note that varying numbers of virtual channels are provided in the different devices. As seen, switch 720 includes 8 virtual channels in this example, each with a corresponding hardware buffer in a link interface 725. Instead, device 730 includes only 4 virtual channels and thus has a link interface 735 including only 4 hardware buffers. Because these devices have disparate numbers of virtual channels and buffers, at least some of the buffers within link interface 725 of switch 720 will not be used. Accordingly, using an embodiment of the present invention, these buffers may be disabled in hardware so that power consumption is avoided for these buffers. While shown with this particular implementation in the embodiment of FIG. 7, understand that many variations are possible.

Figure 8:
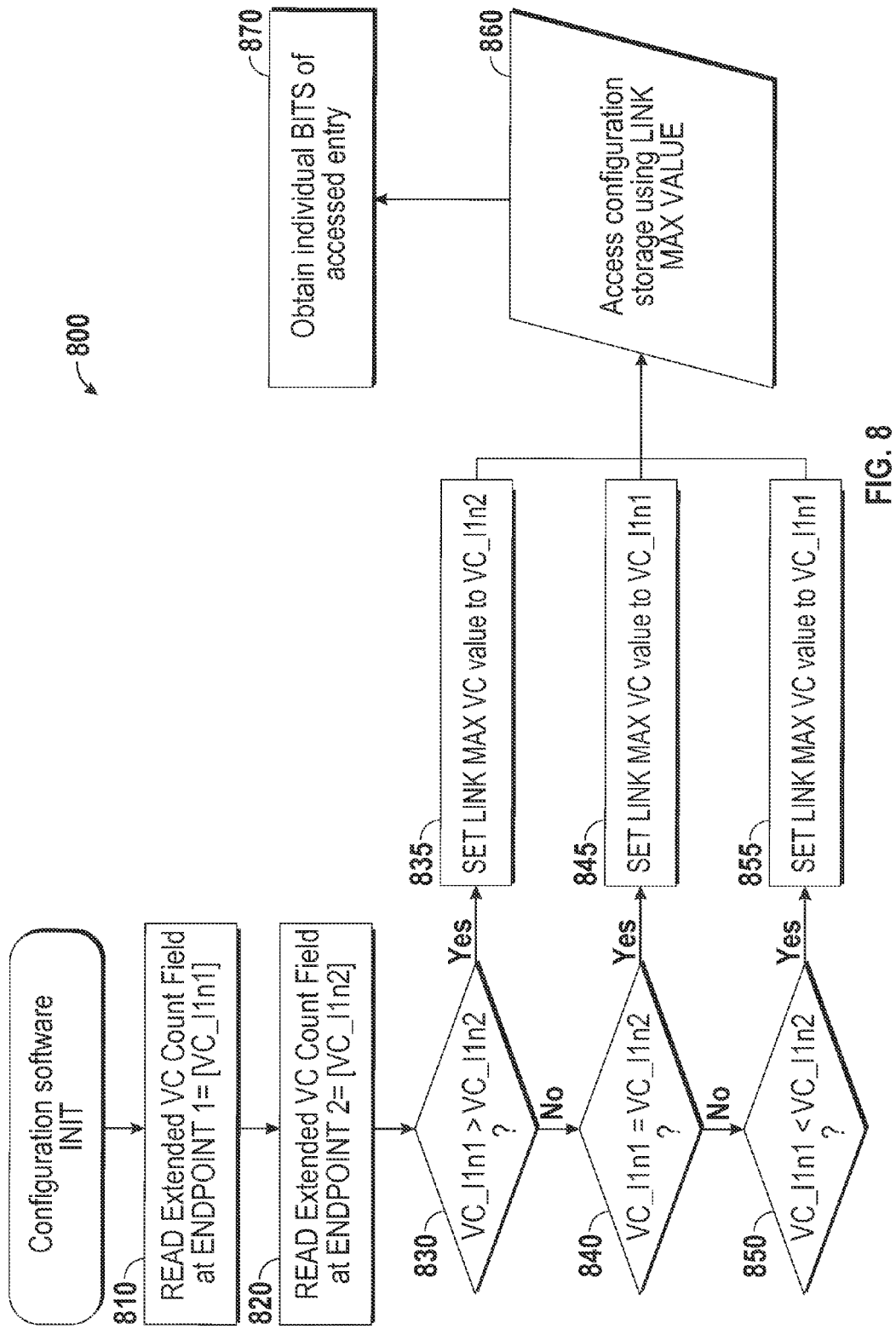
FIG. 8 is a flow diagram of a configuration method in accordance with an embodiment of the present invention.

Referring now to FIG. 8, shown is a flow diagram of a configuration method in accordance with an embodiment of the present invention. In a particular embodiment, method 800 may be performed during device initialization by configuration logic of devices coupled together via a link. Furthermore, the method may also be performed dynamically whenever there is any change to a device or to hardware coupled to a device via a link. For example if a new device is coupled to an endpoint, the link will retrain and configuration logic will re-assign certain determined values accordingly. With reference to FIG. 8, method 800 begins by reading an extended VC count field of a configuration storage, both of a local device or endpoint and of a remote device or endpoint located at the far end of a link that couples these 2 devices (block 810 and block 820). In one embodiment, this extended VC count field may be stored in a storage of the corresponding device, e.g., within a PCIe™ configuration space. Assume for purposes of discussion that the local device (Endpoint 1) corresponds to switch 720 of FIG. 7 and that the remote device (Endpoint 2) corresponds to device 730 of FIG. 7.

With the above stated representation (with 8 virtual channels and buffers present in switch 720 and 4 virtual channels and buffers present in device 730), the value returned for the extended VC count field from switch device 720 will be 8 and the value returned from device 730 will be 4. More particularly in an embodiment in which this count field is a 3-bit field, a value of zero corresponds to a single virtual channel supported (e.g., VC0) and values 1-7 of this 3-bit binary value correspond to the additional number of supported VCs. Thus in this embodiment, the extended VC count field for switch 720 has a value of 111b and the extended VC count field for device 730 has a count of 011b. Of course other representations are possible.

Still with reference to FIG. 8, next control passes to diamond 830 where it can be determined whether the VC count for the local device is greater than the VC count for the remote device. If so, control passes to block 835 where a link maximum VC value may be set to the extended VC count field from the remote device. Note that this link maximum VC value or VC ID value corresponds to a minimum value for the extended VC count field of connected endpoints. And thus in this instance, this link maximum VC value is set to a value of 011b.

However, if this is not the case, control passes instead from diamond 830 to diamond 840 where it can be determined whether the VC count for the local device equals the VC count for the remote device. If so, control passes to block 845 where the link maximum VC value may be set to the extended VC count field from the local device. Otherwise, control passes to diamond 850 where it is determined whether the VC count for the local device is less than the VC count for the remote device. In this case, control passes to block 855 where the link maximum VC value may be set to the extended VC count field from the local device.

Regardless of the link maximum VC value set in one of blocks 835, 845 and 855, control passes next to block 860, where a configuration storage such as a table storage having these link maximum VC values may be accessed. More specifically, by accessing this table another representation of the selected link maximum VC value can be obtained. As will be shown further with regard to FIG. 9A, the table may include a plurality of entries that each provide a 3-bit representation of a maximum link VC value and a corresponding 8-bit representation of the same value. And thus control passes to block 870 where individual bits of the accessed entry may be obtained, where each bit corresponds to one of the available number of virtual channels and represents an enabled state of a corresponding hardware buffer. That is, in an example a logic one value indicates an active buffer and accordingly a corresponding enabled state, and a logic zero value indicates an inactive buffer and accordingly a corresponding disabled state. Of course other representations are possible.

Figures 9A, 9B:
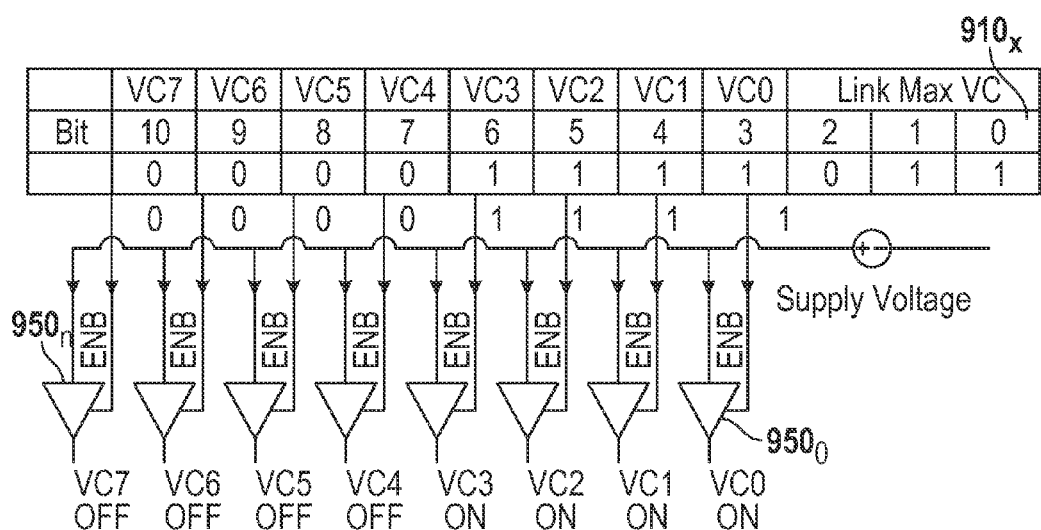
FIG. 9A is a block diagram of a configuration storage in accordance with an embodiment.
FIG. 9B is a block diagram of a portion of a voltage control circuit in accordance with an embodiment.

Now referring to FIG. 9A, shown is a block diagram of a configuration storage in accordance with an embodiment. As shown in FIG. 9A, storage 900 may be present in a desired location within a system, e.g., in a separate non-volatile storage. Or a copy of the information in configuration storage 900 may be present, e.g., in a configuration space of each of the devices of the system. Still further embodiments may store this information in yet another location such as external registers or a read only memory. As seen, storage 900 includes a plurality of entries $910_0$-$910_n$. Each entry includes a first field 920 and a second field 930. First field 920 may correspond to the maximum link VC value and thus is used as an addressable means for accessing a selected entry of storage 900. In turn, second field 930 provides a corresponding 8-bit representation of the maximum link VC value. In an embodiment, the 8-bit value mapped from the VC ID may be such that each bit corresponds to a virtual channel buffer of that endpoint or other lane mapping of the endpoint; e.g., bit 0 maps to VC0, bit 1 maps to VC1 and finally bit 7 maps to VC7. In this embodiment, a binary 1 is indicative of a 'powered on' state, whereas 0 indicates 'powered off'. In an embodiment these states are then driven to voltage control circuitry of each buffer to control provision of an operating voltage to the buffer (or alternately to not provide the operating voltage).

Next referring to FIG. 9B, shown is a selected entry 910x obtained from the table and its use to control provision of an operating voltage to corresponding hardware buffers of a device. More specifically FIG. 9B shows a set of AND gates $950_0$-$950_g$. Each of these logic gates is configured to receive a corresponding bit from the selected entry and a corresponding operating voltage, e.g., obtained from an off-chip voltage regulator. Of course the operating voltage may be received instead from other locations, either on or off-chip. When a given bit is of a logic high value, the AND gate is active and thus the operating voltage is provided to the corresponding hardware buffer. Otherwise, the AND gate does not pass the operating voltage to the buffer, and the buffer is disabled during normal operation, thus reducing power consumption. Although shown at this high level in the embodiment of FIG. 9B, understand that variations are possible.

Figure 10:
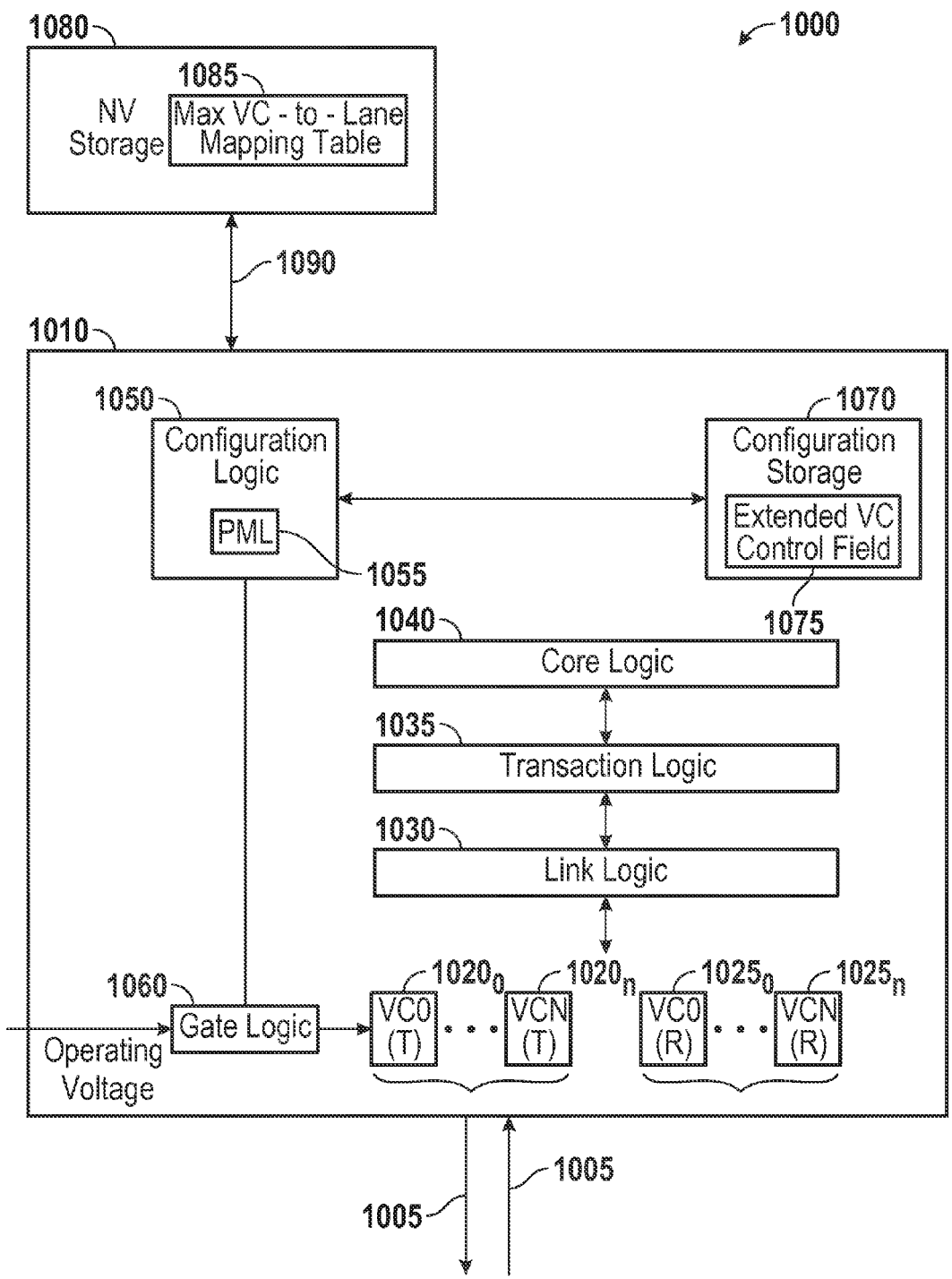
FIG. 10 is a block diagram of a portion of a system in accordance with an embodiment.

Referring now to FIG. 10, shown is a block diagram of a portion of a system in accordance with an embodiment. As shown in FIG. 10, system 1000 may include various components. For purposes of discussion here, shown are simply two components, namely a device 1010, which may be any type of integrated circuit coupled to another circuit (not shown) via a link 1005, and a non-volatile storage 1080 coupled via a link 1090. In the embodiment shown, link 1005 may be a PCIe™ link having unidirectional serial links in a transmit direction and a receive direction.

Device 1010 may be any type of device, including root complex, switch, peripheral device or so forth. Just portions of device 1010 are shown for ease of illustration. More specifically, a set of receive buffers $1025_0$-$1025_n$ are provided. These hardware buffers each may correspond to a given virtual channel $VC_0$-$VC_n$. In addition, a set of transmit buffers $1020_0$-$1020_n$ are also provided, again where each buffer is associated with a particular virtual channel. Note that various traffic classes (TCs) may be assigned to be routed through given VCs and corresponding hardware buffers. Using an embodiment of the present invention, only enabled ones of these virtual channel hardware buffers are provided with an operating voltage via a gate logic 1060 that in turn receives control information from a configuration logic 1050, details of which are discussed further below.

Still with reference to device 1010, buffers 1020 and 1025 may communicate with other circuitry of a physical layer (not shown for ease of illustration in FIG. 10. From there, communication may proceed with a link logic 1030 to perform various link layer processing. Thereafter, communication may proceed with a transaction logic 1035 which may perform transaction layer processing. Thereafter, communications may occur with a core logic 1040, which may be the main logic circuitry of device 1010. For example, in the context of a multi-core processor, core logic 1040 may be one or more processor cores or other processing units. As another example where device 1010 is a graphics accelerator device, core logic 1040 may be a graphics processing unit.

Also shown in FIG. 10 is a configuration logic 1050 which may be hardware, software and/or firmware (or combinations thereof) used to perform configuration operations when system 1000 is powered on, when device 1010 is reset, or when other dynamic changes occur during operation. In an embodiment, configuration logic 1050 may include logic to perform the power management control described herein. Thus in the embodiment shown in FIG. 10, configuration logic 1050 includes a power management logic 1055 that may be configured to execute a method such as method 800 discussed above.

To this end, configuration logic 1050 may communicate with a configuration storage 1070. In various embodiments, configuration storage 1070 may be a non-volatile storage of device 1010 that includes a PCIe™ configuration storage space. Amongst the various configuration information stored here is an extended VC count field 1075, such as described herein. Of course understand that additional configuration information is also stored within storage 1070.

In a particular embodiment, a mapping table that associates a 3-bit maximum VC count value with a corresponding 8-bit value may be provided. Of course, depending on the amount of possible virtual channels, hardware buffers, or other circuitry to be controlled, the number of coded bits and individual bit representations may vary. In the embodiment shown, separate non-volatile storage 1080 may include a mapping table 1085. Mapping table 1085 may thus associate a maximum VC count value to lane mappings. Stated another way, an indication of the number of the maximum number of supported virtual channels may be mapped to a corresponding set of enable indicators that can be used to control whether an operating voltage is provided to one or more hardware buffers, each associated with a corresponding virtual channel. Of course while discussed in this embodiment as controlling hardware buffers based on enabled virtual channels, understand that additional hardware within a device may similarly be controlled. As an example, such additional hardware that may be controlled on a lane-by-lane or virtual channel basis may include a graphics card, a daughter card such as a USB-to-PCIe™ or SATA-to-PCIe™ card, or other such device.

Embodiments thus enable unused hardware such as VC hardware buffers to be powered down under configuration control, e.g., by configuration logic. In this way, system power may be reduced as only hardware that is actually used is powered on.

The following examples pertain to further embodiments.

In an example, an apparatus comprises: a plurality of hardware buffers each to store information associated with one or more virtual channels; a configuration logic to determine an identifier corresponding to a maximum number of virtual channels commonly supported by a first device and a second device coupled via a link and to obtain a control value based on the identifier; and a gate logic to provide an operating voltage to corresponding ones of the plurality of hardware buffers based on the control value.

The gate logic may be configured to prevent provision of the operating voltage to at least one of the plurality of hardware buffers when the maximum number of virtual channels is less than the plurality of hardware buffers, in an embodiment.

In an example, the configuration logic is to determine the maximum number of virtual channels based on a first virtual channel count associated with the first device and a second virtual channel count associated with the second device.

In an example, the configuration logic is to obtain the first virtual channel count from a virtual channel count field of a configuration storage of the first device and to obtain the second virtual channel count from a virtual channel count field of a configuration storage of the second device.

In an example, the gate logic includes a plurality of logic circuits each to receive a bit of the control value and the operating voltage and to provide the operating voltage to one of the plurality of hardware buffers based on a value of the bit.

In an example, a non-volatile storage includes a mapping table having a plurality of entries each to associate an identifier with a control value may be coupled to the apparatus. In an embodiment, the configuration logic is to obtain the control value from an entry of the mapping table accessed using the identifier. The control value may include a plurality of bits each associated with one of the plurality of hardware buffers, each of the bits of a first state to indicate that the associated hardware buffer is to be enabled and of a second state to indicate that the associated hardware buffer is to be disabled.

In an example, the first device comprises a configuration storage to store a count of the maximum number of virtual channels supported by the first device and to further store a copy of one or more entries of the mapping table. In an embodiment, the non-volatile storage is a separate component from the first device and coupled to the first device via a second link.

Note that the above device can be implemented using various means.

In an example, a processor comprises a system on a chip (SoC) incorporated in a user equipment touch-enabled device.

In another example, a system comprises a display and a memory, and includes the device of one or more of the above examples.

In another example, a method comprises: determining a common number of virtual channels supportable by a first endpoint and a second endpoint coupled via a link; accessing a storage using the common number of virtual channels to obtain a control setting corresponding to the common number of virtual channels; and providing an operating voltage to selected first hardware buffers of the first endpoint and selected second hardware buffers of the second endpoint based on the control setting.

In an example, providing the operating voltage includes providing the operating voltage to the selected first and second hardware buffers, and not providing the operating voltage to unselected first hardware buffers and unselected second hardware buffers.

In an example, the method further comprises communicating data between the first endpoint and the second endpoint using the selected first hardware buffers and the selected second hardware buffers.

In an example, the method further comprises accessing, during configuration of the link, the storage using the common number of virtual channels, wherein the storage is separate from the first and second endpoints and includes a plurality of entries each to store a common number of virtual channels and a control setting.

In an example, the method further comprises responsive to re-configuration of the link: determining a second common number of virtual channels supportable by the first and second endpoints; accessing the storage using the second common number of virtual channels to obtain a second control setting; and providing the operating voltage to different ones of the first hardware buffers than the selected first hardware buffers and to different ones of the second hardware buffers than the selected second hardware buffers based on the second control setting.

In another example, a computer readable medium including instructions is to perform the method of any of the above examples.

In another example, an apparatus comprises means for performing the method of any one of the above examples.

In yet another example, an apparatus comprises: a first link interface to interface the apparatus to a link coupled between the apparatus and a second device, the first link interface including a plurality of independent circuits each to communicate data of a corresponding traffic class; a first configuration storage to store a maximum supportable value corresponding to the number of the plurality of independent circuits; a configuration logic to determine a link maximum value corresponding to a minimum of the maximum supportable value stored in the first configuration storage and a maximum supportable value stored in a second configuration storage of the second device and to obtain a different representation of the link maximum value; and a control circuit to enable a first set of the plurality of independent circuits and to disable a second set of the plurality of independent circuits responsive to the different representation, when the link maximum value is less than a number of the plurality of independent circuits.

In an example, the maximum supportable value stored in the first configuration storage further corresponds to a virtual channel count value for the apparatus.

In an example, a non-volatile storage coupled to the apparatus includes a mapping table having a plurality of entries each to associate a link maximum value with a different representation of the link maximum value. The mapping table may be accessed using the link maximum value determined by the configuration logic.

In an example, the different representation includes a plurality of bits each associated with one of the plurality of independent circuits, each of the bits of a first state to indicate that the associated independent circuit is to be enabled and of a second state to indicate that the associated independent circuit is to be disabled.

In an example, the control circuit includes a plurality of logic circuits each to receive a bit of the plurality of bits of the different representation and an operating voltage from a voltage regulator and to provide the operating voltage to one of the plurality of independent circuits based on a value of the bit.

In an example, the plurality of independent circuits each comprises a hardware buffer associated with a virtual channel.

In a still further example, a system comprises: a first device including a first link interface having a first plurality of hardware buffers each to store information associated with one or more virtual channels and a second device coupled to the first device via a link. In an embodiment, the second device includes: a second link interface having a second plurality of hardware buffers each to store information associated with one or more of the virtual channels, where there are more of the second plurality of hardware buffers than the first plurality of hardware buffers; a controller to determine a maximum number of virtual channels commonly supported by the first and second devices, the maximum number corresponding to the number of the plurality of first hardware buffers and to obtain a control value based on the maximum number; and a gate logic to enable less than all of the plurality of second hardware buffers responsive to the control value.

In an example, the first device comprises a first configuration storage including a first maximum virtual channel count, and the second device comprises a second configuration storage including a second maximum virtual channel count.

In an example, the controller is to determine the maximum number of commonly supported virtual channels using the first maximum virtual channel count and the second maximum virtual channel count.

In an example, a non-volatile storage includes a mapping table having a plurality of entries each to associate a maximum number of commonly supported virtual channels.

In an example, the controller may obtain the control value from an entry of the mapping table accessed using the determined maximum number of commonly supported virtual channels. The control value includes a plurality of bits each associated with one of the second plurality of hardware buffers, each of the bits of a first state to indicate that the associated second hardware buffer is to be enabled and of a second state to indicate that the associated second hardware buffer is to be disabled, in an embodiment.

In an example, the gate logic includes a plurality of logic circuits each to receive a bit of the control value and an operating voltage and to provide the operating voltage to one of the plurality of second hardware buffers based on a value of the bit.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a plurality of hardware buffers each to store information associated with one or more virtual channels;
   a configuration logic to determine an identifier corresponding to a maximum number of virtual channels commonly supported by a first device and a second device coupled via a link and to obtain a control value based on the identifier; and
   a gate logic to provide an operating voltage to corresponding ones of the plurality of hardware buffers based on the control value, wherein the gate logic is to prevent provision of the operating voltage to at least one of the plurality of hardware buffers when the maximum number of virtual channels is less than the plurality of hardware buffers.

2. The apparatus of claim 1, wherein the configuration logic is to determine the maximum number of virtual channels based on a first virtual channel count associated with the first device and a second virtual channel count associated with the second device.

3. The apparatus of claim 2, wherein the configuration logic is to obtain the first virtual channel count from a virtual channel count field of a configuration storage of the first device and to obtain the second virtual channel count from a virtual channel count field of a configuration storage of the second device.

4. The apparatus of claim 1, wherein the gate logic includes a plurality of logic circuits each to receive a bit of the control value and the operating voltage and to provide the operating voltage to one of the plurality of hardware buffers based on a value of the bit.

5. The apparatus of claim 1, further comprising a non-volatile storage including a mapping table having a plurality of entries each to associate an identifier with a control value.

6. The apparatus of claim 5, wherein the configuration logic is to obtain the control value from an entry of the mapping table accessed using the identifier.

7. The apparatus of claim 6, wherein the control value includes a plurality of bits each associated with one of the plurality of hardware buffers, each of the bits of a first state to indicate that the associated hardware buffer is to be enabled and of a second state to indicate that the associated hardware buffer is to be disabled.

8. The apparatus of claim 5, wherein the first device comprises a configuration storage to store a count of the maximum number of virtual channels supported by the first device, and the configuration storage is to further store a copy of one or more entries of the mapping table.

9. The apparatus of claim 8, wherein the non-volatile storage is a separate component from the first device and coupled to the first device via a second link.

10. A method comprising:
determining a common number of virtual channels supportable by a first endpoint and a second endpoint coupled via a link;
accessing a storage using the common number of virtual channels to obtain a control setting corresponding to the common number of virtual channels; and
providing an operating voltage to selected first hardware buffers of the first endpoint and selected second hardware buffers of the second endpoint based on the control setting.

11. The method of claim 10, wherein providing the operating voltage includes providing the operating voltage to the selected first and second hardware buffers, and not providing the operating voltage to unselected first hardware buffers and unselected second hardware buffers.

12. The method of claim 10, further comprising communicating data between the first endpoint and the second endpoint using the selected first hardware buffers and the selected second hardware buffers.

13. The method of claim 10, further comprising accessing, during configuration of the link, the storage using the common number of virtual channels, wherein the storage is separate from the first and second endpoints and includes a plurality of entries each to store a common number of virtual channels and a control setting.

14. The method of claim 13, further comprising responsive to re-configuration of the link:
determining a second common number of virtual channels supportable by the first and second endpoints;
accessing the storage using the second common number of virtual channels to obtain a second control setting; and
providing the operating voltage to different ones of the first hardware buffers than the selected first hardware buffers and to different ones of the second hardware buffers than the selected second hardware buffers based on the second control setting.

15. An apparatus comprising:
a first link interface to interface the apparatus to a link coupled between the apparatus and a second device, the first link interface including a plurality of independent circuits each to communicate data of a corresponding traffic class;
a first configuration storage to store a maximum supportable value corresponding to the number of the plurality of independent circuits;
a configuration logic to determine a link maximum value corresponding to a minimum of the maximum supportable value stored in the first configuration storage and a maximum supportable value stored in a second configuration storage of the second device and to obtain a different representation of the link maximum value; and
a control circuit to enable a first set of the plurality of independent circuits and to disable a second set of the plurality of independent circuits responsive to the different representation, when the link maximum value is less than a number of the plurality of independent circuits.

16. The apparatus of claim 15, wherein the maximum supportable value stored in the first configuration storage further corresponds to a virtual channel count value for the apparatus.

17. The apparatus of claim 15, further comprising a non-volatile storage coupled to the apparatus, the non-volatile storage including a mapping table having a plurality of entries each to associate a link maximum value with a different representation of the link maximum value, the mapping table accessed using the link maximum value determined by the configuration logic.

18. The apparatus of claim 17, wherein the different representation includes a plurality of bits each associated with one of the plurality of independent circuits, each of the bits of a first state to indicate that the associated independent circuit is to be enabled and of a second state to indicate that the associated independent circuit is to be disabled.

19. The apparatus of claim 18, wherein the control circuit includes a plurality of logic circuits each to receive a bit of the plurality of bits of the different representation and an operating voltage from a voltage regulator and to provide the operating voltage to one of the plurality of independent circuits based on a value of the bit.

20. The apparatus of claim 15, wherein the plurality of independent circuits each comprises a hardware buffer associated with a virtual channel.

21. A system comprising:
a first device including a first link interface having a first plurality of hardware buffers each to store information associated with one or more virtual channels; and
a second device coupled to the first device via a link, the second device including:
a second link interface having a second plurality of hardware buffers each to store information associated with one or more of the virtual channels, wherein there are more of the second plurality of hardware buffers than the first plurality of hardware buffers;
a controller to determine a maximum number of virtual channels commonly supported by the first and second devices, the maximum number corresponding to the number of the plurality of first hardware buffers and to obtain a control value based on the maximum number; and
a gate logic to enable less than all of the plurality of second hardware buffers responsive to the control value.

22. The system of claim 21, wherein the first device comprises a first configuration storage including a first maximum virtual channel count, and the second device comprises a second configuration storage including a second maximum virtual channel count.

23. The system of claim 22, wherein the controller is to determine the maximum number of commonly supported virtual channels using the first maximum virtual channel count and the second maximum virtual channel count.

24. The system of claim 21, further comprising a non-volatile storage including a mapping table having a plurality of entries each to associate a maximum number of commonly supported virtual channels.

25. The system of claim 24, wherein the controller is to obtain the control value from an entry of the mapping table accessed using the determined maximum number of commonly supported virtual channels.

26. The system of claim 25, wherein the control value includes a plurality of bits each associated with one of the second plurality of hardware buffers, each of the bits of a first state to indicate that the associated second hardware buffer is to be enabled and of a second state to indicate that the associated second hardware buffer is to be disabled.

27. The system of claim 26, wherein the gate logic includes a plurality of logic circuits each to receive a bit of the control value and an operating voltage and to provide the operating voltage to one of the plurality of second hardware buffers based on a value of the bit.

* * * * *